March 3, 1953 M. C. WALTZ 2,630,491

VARIABLE ATTENUATOR

Filed March 7, 1946

INVENTOR.
MAYNARD C. WALTZ

BY M. C. Hayes

ATTORNEY

Patented Mar. 3, 1953 2,630,491

UNITED STATES PATENT OFFICE 2,630,491

VARIABLE ATTENUATOR

Maynard C. Waltz, Maplewood, N. J., assignor, by mesne assignments, to the United States of America as represented by the Secretary of the Navy Application March 7, 1946, Serial No. 652,520

9 Claims. (Cl. 178—44)

This invention relates to attenuators, and particularly to continuously variable constant impedance attenuators.

Heretofore constant input and output impedance attenuators have been limited to compensated step attenuators when used at frequencies where the effect of distributed capacity and inductance of the circuit components is appreciable.

An object of this invention is to provide a continuously variable constant impedance attenuator for a signal of any frequency.

Another object of this invention is to provide a continuously variable constant impedance attenuator in which the distributed capacity and inductance of the circuit components have no effect upon the attenuator's characteristics.

These and other objects will be apparent to one skilled in the art from the following specification when taken with the accompanying drawing, in which.

Figure 1:
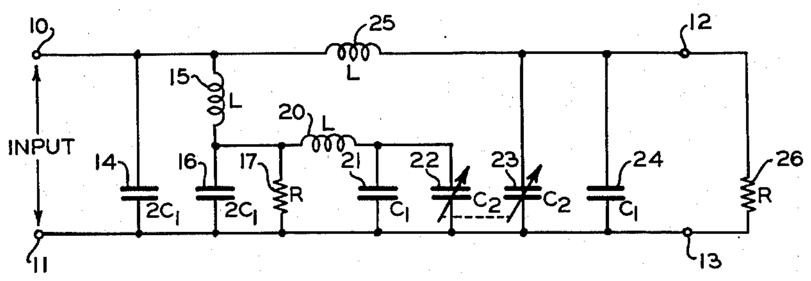
Fig. 1 is a schematic diagram of a system embodying the principles of the invention.

Referring to the drawing, and particularly to Fig. 1, terminals 10 and 11 and terminals 12 and 13 are respectively the input and output of the four terminal network attenuator. Shunting the input is capacitor 14 in parallel with a network composed of inductor 15, capacitor 16, and resistor 17. From the junction between inductor 15 and capacitor 16, inductor 20, in series with parallel capacitors 21 and 22, shunt the network of parallel capacitor 16 and resistor 17. Capacitor 22 is gang tuned with capacitor 23, the latter of which is connected in parallel with capacitor 24 across output terminals 12 and 13. Connecting input terminal 10 and output terminal 12 is inductor 25. Load resistance 26 is the termination impedance and may comprise a transmission line connecting the continuously variable constant impedance attenuator to an amplifier or detector (not shown on the drawing).

For the circuit components described above:

Capacitors 21 and 24 are equal in value and each represented by $C_1$.

Capacitors 14 and 16 are equal in value and each equal to $2C_1$.

Capacitors 22 and 23 are equal in value and each represented by $C_2$.

Inductances 15, 20 and 25 are equal in value and each represented by L.

Resistors 17 and 26 are equal in value and each represented by R.

The required relationships between R, L, and $C_1$ are defined by the equations:

$$L=\frac{R}{W} \text{ and } C_1=\frac{1}{WR}$$

where W is the angular velocity of the signal to be attenuated.

Figure 2:
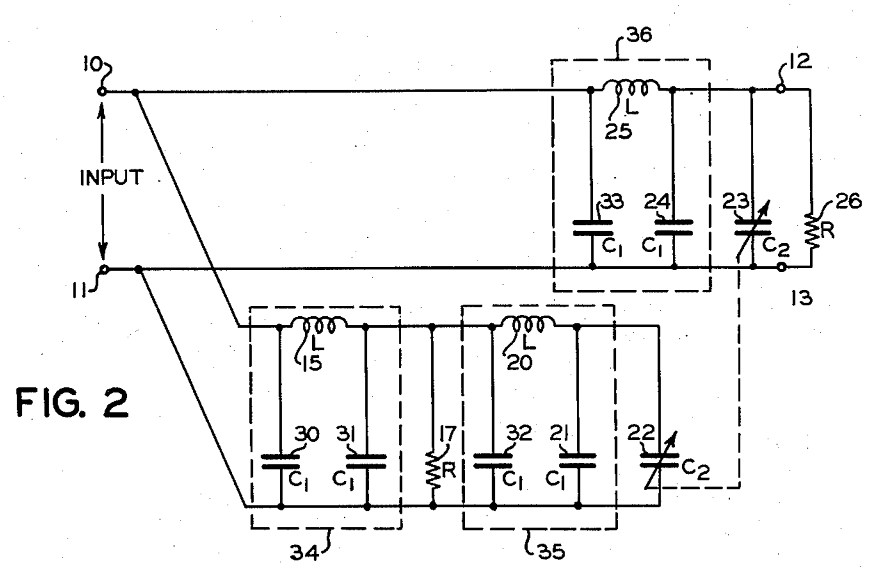
Fig. 2 is a schematic diagram of the components of Fig. 1 rearranged to show their equivalence to quarter wave length sections of transmission line.

Referring to Fig. 2, which is an equivalent circuit of the attenuator of Fig. 1, $\pi$ network 34, composed of capacitor 30 equal to one-half of capacitor 14, inductor 15, and capacitor 31 which is equal to one-half of capacitor 16 (Fig. 1) is connected across input terminals 10 and 11, and is terminated by resistor 17. The $\pi$ section network 35, composed of capacitor 32, equal to one-half of capacitor 16 (Fig. 1), inductor 20, and capacitor 21, is connected across resistor 17 and is terminated by the impedance of variable capacitor 22. The $\pi$ section network 36, composed of capacitor 33, equal to one-half of capacitor 14 (Fig. 1), inductor 25, and capacitor 24 bridges input terminals 10 and 11 and is terminated by the impedance of variable capacitor 23 and terminating resistance 26 at output terminals 12 and 13.

From the above design equations it is apparent that, $/X_L/=/X_{C_1}/=R$ where $/X_L/$ is the absolute value of the inductive reactance of inductance L and $/X_{C_1}/$ is the absolute value of the capacitive reactance of capacitor $C_1$. Thus the $\pi$ sections 34, 35, and 36, are each the electrical equivalent of a quarter wave length of transmission line whose characteristic impedance, $Z_0$, is equal to R.

Figure 3:
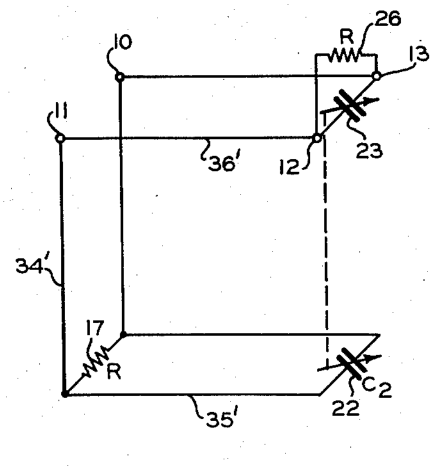
Fig. 3 is a representation of the invention using three quarter wave length transmission line sections.

Referring to Fig. 3, $\pi$ section 34 is shown as an equivalent odd number of quarter wave lengths of transmission line 34' connected to input terminals 10 and 11 and terminated by resistance 17. The $\pi$ network 35 is shown as an equivalent odd number of quarter wave lengths of transmission line 35' extending from resistor 17 and terminated by ganged variable condenser 22. The $\pi$ section network 36 is shown as an odd number of quarter wave lengths of transmission line 36' connected to input terminals 10 and 11 and terminated by ganged variable condenser 23 and resistor 26 at the output terminals 12 and 13.

In operation, a constant frequency signal is introduced at input terminals 10 and 11, and the attenuated signal taken from output terminals 12 and 13.

If zero attenuation is desired, ganged variable condensers 22 and 23 are adjusted for substantially zero capacity, which is infinite impedance. With reference to Fig. 3, an infinite impedance termination on transmission line 35' reflects a short circuit at resistor 17, which in turn reflects an infinite impedance through transmission line 34' at input terminals 10 and 11. Thus capacitor 23 being tuned for infinite impedance leaves resistance 26 terminating transmission line 36' so that all of the signal introduced at input terminals is fed to output terminals 12 and 13 across resistance R.

If substantially 100% attenuation is desired, ganged variable condensers 22 and 23 are adjusted for an extremely large capacity, or substantially zero impedance. Transmission line 35' thus reflects an infinite impedance across resistor 17, and transmission line 36' reflects an infinite impedance across the input terminals 10 and 11. Therefore, input terminals 10 and 11 are terminated by resistance 17 and all of the input signal appears across resistor 17 with none across the output terminals 12 and 13.

If 50% attenuation is desired, ganged variable condensers 22 and 23 are adjusted so that $Xc_2=R$. Transmission line 35' then places a reactive inductance equal to R in parallel with resistor 17. The terminating impedance of line 34' is then $$\frac{R+jR}{2}$$

which places an impedance $R-jR$ across input terminals 10 and 11. Transmission line 36' is terminated in an impedance of $$\frac{R-jR}{2}$$

composed of resistor 26 of value R in parallel with capacitor 23 of impedance $(-jR)$. This impedance appears across input terminals 10 and 11 as $R+jR$. Since $R+jR$ and $R-jR$ are in parallel at terminals 10 and 11, the input impedance is R.

For other values of capacity, $C_2$, obtained by adjusting ganged variable condensers 22 and 23, the attenuation will change accordingly and the input impedance will remain a constant resistive value equal to R.

The constant impedance continuously variable attenuator may be calibrated by measuring the current, I, flowing into the network at terminal 10, and the current, $I_2$, flowing out of the network at terminal 12. The equation for calibration is:

$$|I_2|=|I|\sqrt{\frac{1}{1+\frac{W^2C_2^2L}{C_1}}}$$

It is apparent that two attenuators of the type shown in Fig. 1 can be placed "back to back" to form a continuously variable attenuator, over any desired limits, which has constant input and constant output impedance.

Although the attenuator of the present invention has been disclosed specifically as comprised of lumped constants, in Fig. 1, and has been analysed from the point of view of transmission lines, Fig. 3, it will be understood that a practical attenuator may be made up of either lines of lumped constants, or a combination of the two.

Although the drawing and specification show what is now considered to be the most desirable arrangement, it will be apparent to one skilled in the art that various changes and modifications may be made therein without departing from the scope of the invention as set forth in the appended claims.

What is claimed is:

1. A four terminal attenuator having input and output terminals, means for applying a fixed frequency signal to said input terminals, means for extracting a signal at said output terminals, means for controlling the power of said extracted signal comprising a first network bridging said input and output terminals, said first network being the electrical equivalent of a quarter wave length section of transmission line having a predetermined characteristic impedance, said means for extracting a signal from said output terminals having an impedance equal to said characteristic impedance, said first network being terminated by a first variable condenser, a second network connected to said input terminals, said second network being the electrical equivalent of a quarter wavelength section of transmission line of the aforesaid characteristic impedance, said second network being terminated by a resistance equal to said characteristic impedance, a third network connected across said resistance, said third network being the electrical equivalent of a quarter wave length section of transmission line of the aforesaid characteristic impedance, said third network being terminated by a second variable condenser, substantially equal to said first variable condenser and being gang tuned therewith.

2. A four terminal attenuator having input and output terminals, a first artificial transmission line having an equivalent length equal to a quarter wave length at the frequency of operation and a predetermined characteristic impedance connected between said input and output terminals, a load impedance equal to the characteristic impedance of said first transmission line connected across said output terminals, said first transmission line being terminated by a first variable condenser, a second artificial transmission line having an equivalent length equal to a quarter wave length and a characteristic impedance equal to the characteristic impedance of said first line connected across said input terminals, said second line being terminated by a resistance equal to said characteristic impedance, and a third artificial transmission line connected across said resistor, said third line having an equivalent length of a quarter wave length and the aforesaid characteristic impedance, said third line being terminated by a second variable condenser equal in capacity to said first condenser and gang tuned therewith.

3. A four terminal attenuator having input and output terminals, means for applying a fixed frequency signal to said input terminals, first, second and third networks each being the equivalent of a quarter wave length section of transmission line at said frequency and having a predetermined characteristic impedance, a load having an impedance equal to said characteristic impedance connected across said output terminals, said first network being connected between said input and output terminals and being terminated by a first variable condenser, said second network being connected across said input terminals and terminated by a resistance equal to said characteristic impedance, said third network being connected across said resistance and terminated by a second variable condenser, said first and second condensers being gang tuned and of substantially equal capacity.

4. A continuously variable four terminal attenuator having constant input and output impedances throughout its operating range comprising, input and output terminals, means for applying a fixed frequency signal to said input terminals, first, second and third networks of inductance and capacitance of such value as to be the electrical equivalent of a quarter wave length section of transmission line having a predetermined characteristic impedance, said first network being connected between said input and output terminals and terminated by a first variable condenser, a load having an impedance equal to said characteristic impedance connected across said output terminals, said second network being connected across said input terminals and terminated by a resistive impedance equal to said characteristic impedance, said third network being connected across said resistive impedance and terminated by a second variable condenser, and means for simultaneously adjusting the capacity of said first and second capacitors.

5. A continuously variable four terminal attenuator having constant input and output impedances throughout its operating range comprising, input and output terminals, a first network having the electrical properties of a quarter wave length section of transmission line of predetermined characteristic impedance connected between said input and output terminals, a resistive load having an impedance equal to said characteristic impedance connected across said output terminals, said first network being terminated in a first variable condenser, and a second network connected in shunt with said first network across said input terminals, said second network being terminated in a second variable condenser of substantially equal capacity with said first condenser and gang tuned therewith, said second network having the electrical properties of a half-wave length section of transmission line at the operating frequency shunted at its midpoint by a resistance equal to said characteristic impedance whereby upon tuning of said condensers the attenuation provided between said input and output terminals is variable and the input impedance across said input terminals is maintained equal to said characteristic impedance.

6. A continuously variable four terminal attenuator having constant input and output impedances throughout its operating range comprising, input and output terminals, a first four terminal network being the equivalent of a section of transmission line having an electrical length equal to an odd number of quarter wave lengths at the operating frequency and having a predetermined characteristic impedance connected between said input and output terminals and terminated by a first variable condenser, a load having an impedance equal to said characteristic impedance connected across said output terminals, a second four terminal network being the equivalent of a section of transmission line having an electrical length equal to an odd number of half wave lengths at the operating frequency and also having said predetermined characteristic impedance and terminated by a second variable condenser, said second network being connected across said input terminals and shunted at its midpoint by a resistance equal to said characteristic impedance, and means for simultaneously adjusting the capacity of said first and second condensers.

7. A four terminal attenuator comprising, input and output terminals, a first network being the equivalent of a section of transmission line having an electrical length equal to a quarter wave length at the operating frequency and having a predetermined characteristic impedance connected between said input and output terminals and terminated by a first variable condenser, a load having an impedance equal to said characteristic impedance connected across said output terminals, a second network being the equivalent of a section of transmission line having an electrical length equal to a half wave length at the operating frequency and also having said predetermined characteristic impedance and terminated by a second variable condenser, said second network being connected across said input terminals and shunted at its midpoint by a resistance equal to said characteristic impedance, and means for simultaneously adjusting the capacity of said first and second condensers.

8. An attenuator for high frequency oscillations comprising, input and output terminals, a first transmission line having an electrical length equal to a quarter wave length at the operating frequency connected between said input and output terminals and terminated by a first variable condenser, a second transmission line having an electrical length equal to a half wave length at the operating frequency connected across said input terminals in shunt with said first line and terminated by a second variable condenser, said first and second lines having the same characteristic impedance and said second line being shunted at its midpoint by a resistance equal to said characteristic impedance, and a load having an impedance equal to said characteristic impedance connected across said output terminals, said attenuator upon simultaneously tuning said condensers providing continuous impedance variation between said input and output terminals while maintaining constant the impedance across said input terminals.

9. Apparatus in accordance with claim 8 wherein said condensers are gang tuned to have substantially equal capacity throughout their tuning range.

MAYNARD C. WALTZ.

REFERENCES CITED

The following references are of record in the file of this patent:

UNITED STATES PATENTS

| Number | Name | Date |
|---|---|---|
| 1,909,610 | Carter | May 16, 1933 |
| 2,024,234 | Kunze | Dec. 17, 1935 |
| 2,072,946 | Farnham | Mar. 9, 1937 |
| 2,284,529 | Mason | May 26, 1942 |
| 2,401,863 | Espley | June 11, 1946 |